United States Patent [19]

Hastie

[11] Patent Number: 5,395,083

[45] Date of Patent: Mar. 7, 1995

[54] TETHER AND FOOT RESTRAINING DEVICE, SECURING HANDRAIL BRACKET

[75] Inventor: James C. Hastie, Mississauga, Canada

[73] Assignee: Canadian Space Agency, Canada

[21] Appl. No.: 67,988

[22] Filed: May 27, 1993

[51] Int. Cl.[6] ............................................. E04G 5/00
[52] U.S. Cl. .................................. 248/309.1; 182/113; 248/500; 256/59
[58] Field of Search ............ 248/127, 176, 200, 309.1, 248/314, 500; 256/59, 65; 182/113

[56] References Cited

U.S. PATENT DOCUMENTS

| | | | |
|---|---|---|---|
| 687,482 | 11/1901 | Lenderson | 248/127 |
| 3,995,833 | 12/1976 | McLaughlin et al. | 256/65 X |
| 4,037,824 | 7/1977 | Whitmer | 182/113 X |
| 4,363,467 | 12/1982 | Bos | 256/65 X |
| 4,760,985 | 8/1988 | Stewart et al. | 248/176 |
| 4,830,341 | 5/1989 | Arteau et al. | 256/59 X |
| 4,989,689 | 2/1991 | Berlin | 182/113 X |
| 5,145,153 | 9/1992 | Glynn | 256/59 |
| 5,188,342 | 2/1993 | Oullette et al. | 256/59 X |

OTHER PUBLICATIONS

Space News, vol. 3, No. 46, Dec. 7-13, 1992, p. 15.

Primary Examiner—Ramon O. Ramirez
Assistant Examiner—Derek J. Berger
Attorney, Agent, or Firm—David J. French

[57] ABSTRACT

A tether, and foot restraining device, securing handrail bracket is provided, suitable for use by an astronaut performing tasks outside a spacecraft, comprising a handrail column having a foot restraining socket and anchor pin. The column is attached to a mounting flange which has an upstanding, column reinforcing rib provided with a tether securing aperture.

5 Claims, 2 Drawing Sheets

TETHER AND FOOT RESTRAINING DEVICE, SECURING HANDRAIL BRACKET

BACKGROUND OF THE INVENTION

1. Field of the Invention

This invention relates to a tether, foot restraining device, handrail securing bracket.

When, for example, astronauts are required to perform tasks outside a spacecraft, or a space station, it is necessary for the astronaut to be tethered to, and also to be able to grip a handrail.

2. Description of the Prior Art

It has been found desirable to provide a foot restraining device for removably securing the feet of an astronaut, once the handrail has been gripped, so that both hands of the astronaut are free. One such foot restraining device has been developed by Lockheed Engineering & Sciences Co., Houston, Tex., U.S.A., and is described in Space News, Vol. 3, No. 46, December 7–13, 1992.

SUMMARY OF THE INVENTION

As far as spacecraft and spacestations are concerned, space requirements during transportation, hardware component parts, and weight for any device need to be kept to a minimum while at the same time providing adequate strength.

There is a need for a tether, and foot restraining device, securing handrail bracket wherein the space requirements during transportation, hardware component parts, and weight are minimal, and, at the time, adequate strength is provided for the safety of an astronaut.

According to the present invention there is provided a tether, and foot restraining device, securing handrail bracket, comprising:
 a) a column having,
  i) a handrail securing means for immovably securing a handrail for the handrail to extend laterally from an upper portion of the column, and
  ii) a foot restraining device securing means for mounting the device in an immovable manner to extend upwardly from the column at a position clear of the handrail,
 b) a column mounting flange attached to a base portion of the column and extending laterally therefrom, and
 c) an upstanding, column reinforcing and tether securing rib attaching the flange to the column, the reinforcing rib having tether securing means disposed clear of the handrail.

The handrail securing means and reinforcing rib may extend laterally from the column in substantially opposite directions.

The mounting flange may have an upturned, column reinforcing portion which extends upwardly along a portion of the column beneath the handrail.

The handrail securing means may comprise a non-circular, tubular socket for mating with a similarly shaped handrail in a relatively non-rotatable manner.

In some embodiments of the present invention, the reinforcing rib is an upstanding plate on the flange, one edge of the plate extends along and is attached to the column, an upper edge of the plate extends away from the column, and another edge of the plate curves away from the upper edge to slope downwardly away from the column to the flange, and the tether securing means is a weight reducing smooth, snag free surface bounded aperture in the plate and is adjacent to the upper edge thereof.

The smooth snag free surface bounding the weight reducing aperature may comprise upper and lower plate inner surfaces, which diverge from each other in a direction away from the column, and curved, plate inner surfaces which curve away from, and blend smoothly with, the upper and lower plate inner surfaces, and the weight reducing aperture may be marginally spaced from, and shaped to substantially follow, the contour of an upper portion of the plate along the marginal spacing therefrom.

BRIEF DESCRIPTION OF THE DRAWINGS

In the accompanying drawings which illustrate, by way of example, an embodiment of the present invention.

DETAILED DESCRIPTION OF THE PREFERRED EMBODIMENT

Figure 1:
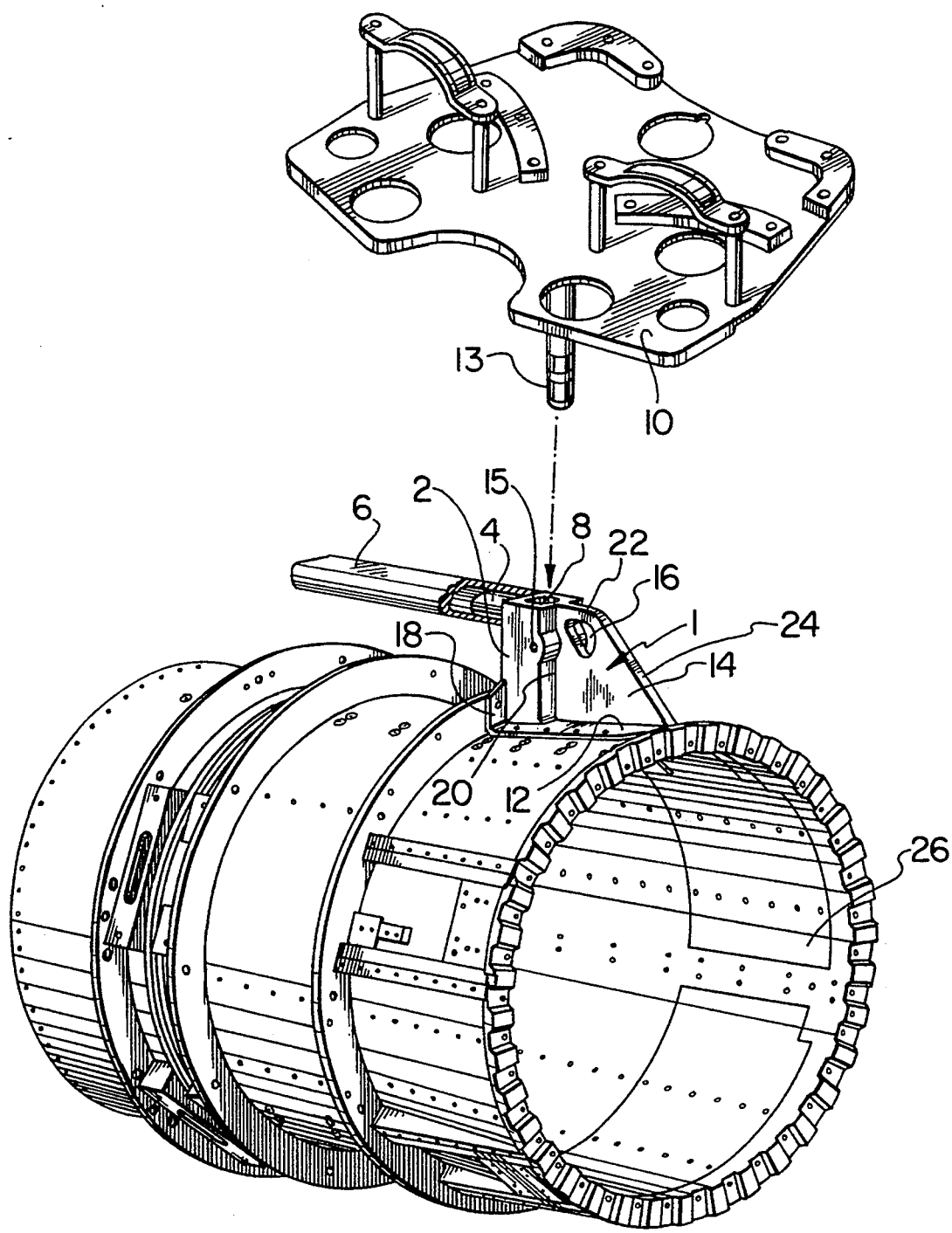
FIG. 1 is a partly sectioned, corner view of a tether, and foot restraining device, securing handrail bracket mounted on a latching end effector and with a foot restraining device about to be secured to the bracket.
Figure 2:
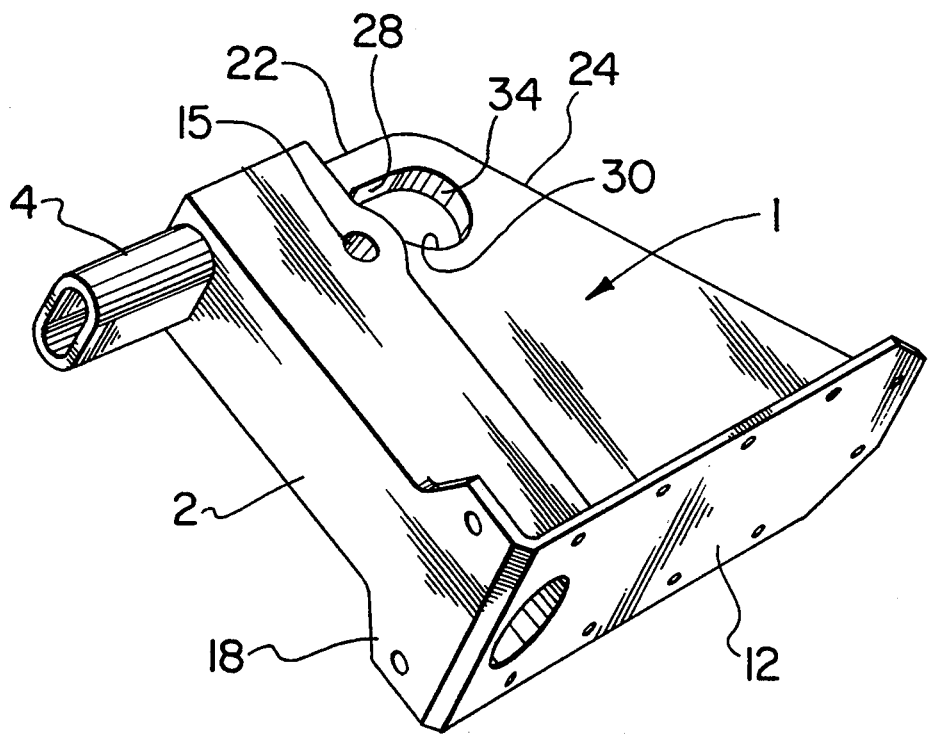
FIGS. 2 and 3 are enlarged, corner views of the handrail bracket shown in FIG. 1.
Figure 3:
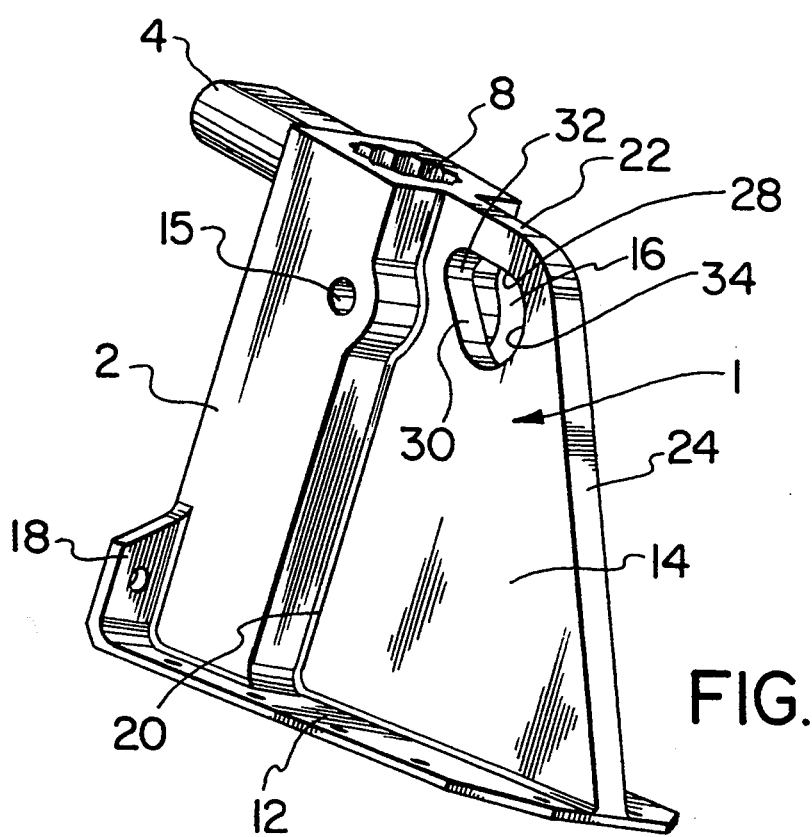

In FIGS. 1 to 3 there is shown a tether, and foot restraining device, securing handrail bracket, generally designated 1, comprising:
 a) a column 2 having,
  i) a handrail securing means 4, for immovably securing a handrail 6 for the handrail 6 to extend laterally from an upper portion of the column 2, and
  ii) a foot restraining device 10 securing means 8 for mounting the device 10 in an immovable manner to extend upwardly from the column 2 at a position clear of the handrail 6,
 b) a column mounting flange 12 attached to a base portion of the column 2 and extending laterally therefrom, and
 c) an upstanding, column reinforcing and tether securing rib 14 attaching the flange 12 to the column 2, the reinforcing rib 14 having tether securing means 16 disposed clear of the handrail 6.

In this embodiment, the handrail securing means 4 comprises a non-circular, tubular socket for mating with a similarly shaped handrail 6 in a relatively non-rotatable manner, and the tubular socket and the reinforcing rib 14 extend laterally from the column in substantially opposite directions.

The foot restraining device 10 is of the type that has been developed by Lockheed Engineering & Sciences Co., Houston, Tex., U.S.A., and which is described in Space News, Vol. 3, No. 46, December 7–13, 1992. The foot restraining device 10 securing means 8 comprises a receptacle forming portion of the column 2 having a 12-point polygon-shaped or 12-toothed socket in the column 2, for receiving a hex-shaped probe 13, having circumferentially spaced, tooth-shaped projections, on the foot restraining device 10, and an anchor pin 15.

The mounting flange 12 has an upturned, column reinforcing portion 18 which extends upwardly, beneath the handrail, along a portion of the column 2 to which it is attached.

The reinforcing rib 14 is an upstanding plate on the flange 12, one edge 20, FIGS. 1 and 3, of the plate extends along and is attached to the column 2. An upper edge 22 of the plate extends away from the column 2, and another edge 24 of the plate curves away from the upper edge 22 to slope downwardly away from the column to the flange 12, and the tether securing means 16 comprises a weight reducing smooth, snag free surface bounded aperture 26 in the plate and is adjacent to the upper edge 22 thereof.

The smooth, snag free surface bounding the weight reducing aperture 26 comprises upper and lower plate inner surfaces, 28 and 30 respectively, which diverge from each other in a direction away from the column 2, and curved plate inner surfaces, 32 and 34 which curve away from, and blend smoothly with, the upper and lower plate inner surfaces 28 and 30 respectively. The weight reducing aperture 26 is marginally spaced from, and shaped to substantially follow, the contour of an upper portion of the plate.

It is within the scope of the present invention for the handrail 6 to extend laterally from both sides of the column 2, in which case the reinforcing rib 14 will be disposed at right angles to the handrail 6.

In this embodiment the bracket 1 is mounted externally on a latching end effector 26, FIG. 1, on a space craft (not shown). The end effector 26 is for capturing and securing a grapple fixture (not shown) on, for example, an orbiting satellite (not shown).

When the end effector 26 has captured and secured a satellite by means of the grapple fixture thereon, an astronaut may leave the spacecraft, grip the handrail 6, secure a tether (not shown) to the tether securing means 16, and anchor his or her feet to the foot restraining device 10. Both of the astronauts hands are now free to perform whatever tasks are necessary on the satellite.

It will be seen that with the tether, and foot restraining device, securing handrail bracket of the present invention, the space requirements during transportation, hardware component parts, and weight are minimal, and at the same time, adequate strength is provided for the safety of the astronaut.

I claim:

1. A tether, foot restraining device, and handrail securing bracket, comprising:
  a) a column with a base end having:
    i) a handrail securing means for immovably securing a handrail for the handrail to extend laterally from an upper portion of the column, and
    ii) a foot restraining device securing means for mounting a foot restraining device in an immovable manner to extend upwardly from the column at a position clear of the handrail,
  b) a column mounting flange attached to the base end of the column and extending laterally therefrom, and
  c) an upstanding, column reinforcing and tether securing rib attached between the flange and the column, the reinforcing rib having tether securing means disposed clear of the handrail securing means.

2. A bracket according to claim 1, wherein the handrail securing means and the reinforcing rib extend laterally from the column in substantially opposite directions.

3. A bracket according to claim 2, wherein the mounting flange has an upturned, column reinforcing portion which extends upwardly, beneath the handrail securing means, along a portion of the column to which it is attached.

4. A bracket according to claim 1, wherein the reinforcing rib is an upstanding plate on the flange, one edge of the plate extends along and is attached to the column, an upper edge of the plate extends away from the column, and another edge of the plate curves away from the upper edge to slope downwardly away from the column to the flange, and the tether securing means is a weight reducing, smooth, snag free surface bounded aperture in the plate and is adjacent to the upper edge thereof.

5. A bracket according to claim 4, wherein the smooth, snag free surface bounding the weight reducing aperture comprises upper and lower plate inner surfaces, which diverge from each other in a direction away from the column, and curved plate inner surfaces which curve away from, and blend smoothly with, the upper and lower plate inner surfaces, and wherein the weight reducing aperture is marginally spaced from, and shaped to substantially follow, the contour of an upper portion of the plate along the marginal spacing therefrom.

* * * * *